DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 7

T903,013

POLYESTER COMPOSITIONS HAVING HIGH DIELECTRIC CONSTANTS, FILMS THEREOF AND SHAPED ARTICLES

John O. Sharp and Richard G. Devaney, both of P.O. Box 511, Kingsport, Tenn. 37901

Continuation of application Ser. No. 81,126, Oct. 15, 1970. This application Oct. 5, 1971, Ser. No. 186,817

Int. Cl. C08g *51/04*

U.S. Cl. 260—40 R

No Drawing. 9 Pages Specification

Compositions comprising a linear polyester derived from terephthalic acid, isophthalic acid, hexahydroisophthalic acid and 1,4-butanediol, said composition containing from 70 to 90 weight percent, based on the weight of the composition, of rutile titanium dioxide, said compositions having a dielectric constant of at least 50. These compositions advantageously form films and coatings which find utility in areas such as electrical components and molded articles.